United States Patent [19]

Euler

[11] 4,020,315
[45] Apr. 26, 1977

[54] METHOD OF WELDING MOUNTING MEMBERS TO A WIRE

[75] Inventor: Reinhold Euler, Kelkheim, Taunus, Germany

[73] Assignee: Hoechst Aktiengesellschaft, Frankfurt, Germany

[22] Filed: Aug. 23, 1974

[21] Appl. No.: 500,007

Related U.S. Application Data

[63] Continuation of Ser. No. 329,555, Feb. 5, 1973, abandoned.

[30] Foreign Application Priority Data

Feb. 7, 1972   Germany ............................ 2205602

[52] U.S. Cl. .............................. 219/91; 29/630 D; 174/94 R; 250/325; 339/275 R; 403/291; 219/97
[51] Int. Cl.² ......................................... B23K 11/10
[58] Field of Search .......... 403/291, 220, 203, 166; 29/630 A, 630 D; 339/275 R; 219/97, 91; 174/94 R; 250/324, 325, 326; 313/278; 338/318

[56] References Cited
UNITED STATES PATENTS

| | | | |
|---|---|---|---|
| 1,692,573 | 11/1928 | Robinson | 313/278 |
| 1,819,554 | 8/1931 | Hanson | 174/94 R |
| 2,601,276 | 6/1952 | Gordon | 174/94 R |
| 2,759,092 | 8/1956 | Fortin | 338/318 |
| 2,922,883 | 1/1960 | Giamimo | 250/326 |
| 3,146,385 | 8/1964 | Carlson | 350/325 |

*Primary Examiner*—E. A. Goldberg
*Attorney, Agent, or Firm*—Stevens, Davis, Miller & Mosher

[57] ABSTRACT

A corona discharge wire made of electrically conducting wire of high tensile strength to which is connected a metallic fixing element on both sides of the discharge portion. The element forms a fused mass disposed in a zone surrounding the wire and solidified around it. The fixing element may consist of two parallel pieces of wire interconnected by an annular extension.

2 Claims, 12 Drawing Figures

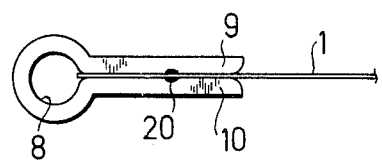
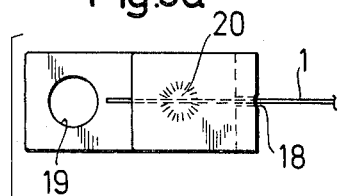
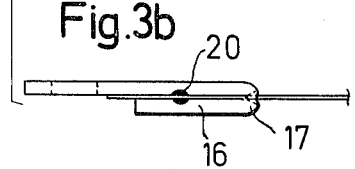
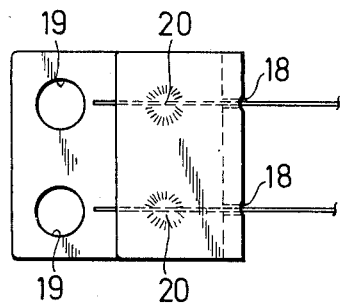
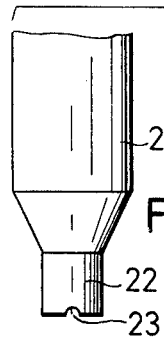 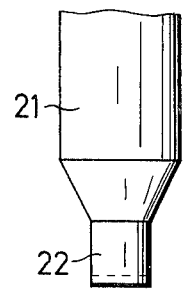 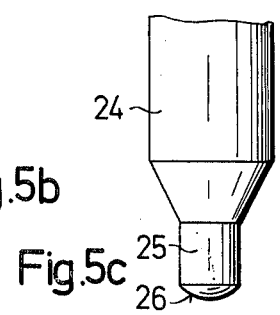

METHOD OF WELDING MOUNTING MEMBERS TO A WIRE

This is a continuation of application Ser. No. 329,555, filed Feb. 5, 1973 now abandoned.

The present invention relates to a corona discharge wire which includes a discharge portion made of a very thin electrically conducting wire of very high tensile strength. The present invention also relates to a corona discharge apparatus incorporating a discharge wire and to a method of producing the discharge wire of the present invention.

Particularly in the branch of industry concerned with electrophotography, it is a known practice to use discharge equipment which includes, as charge-emitting elements, thin tensioned stretched metal wires which are clamped by their ends in holders. If it is required to charge photoconductors or other webs of material as uniformly as possible using an apparatus of this kind, usually known as a corona, a high degree of straightness is needed in the tensioned discharge wires. Furthermore the mechanical tension applied to the discharge wires and thus the straightness of the wires should be maintained for as long as possible, since a change in tension in the wire can lead to its sagging and thus to a breakdown of the electrophotographic copying machine.

Various methods have been proposed for fixing the wires in their holders as securely as possible, and at least some of these methods form part of the prior art.

A known method of securing discharge wires in a corona discharge apparatus consists in forming the wire into a loop and then twisting it. It is also possible to secure the loop with the aid of a metal sleeve. It also has been proposed to thread the discharge wire through an apertured peg of plastic material and to prevent it from slipping out by means of a tapered pin. A further proposal that has been put forward is that of threading the wire several times through the peg of plastic material.

However all these methods have suffered from numerous disadvantages. Because of the high tensile stress to which the wires are subjected, there arises the danger of a change in length combined with a considerable risk of breakage due to the mechanical loading of the wire. The production of the aforementioned fixing means is difficult and time consuming. Production on an automatic basis has given very poor results. It has not been possible, using any of the aforementioned methods, to obtain a length of discharge wire accurate to within approximately ± 0.1 mm. Finally, the fixing means for the wires can become loose, so that the wires are fitted in the discharge apparatus in a random manner.

The object of the present invention therefore is to provide a corona discharge wire which does not suffer from the abovementioned disadvantages, can in particular be produced in remarkably exact lengths which remain constant up to the point at which plastic flow is caused by the tensile loading, can be simply and safely handled and can be subjected without danger to a heavy tensile load. Furthermore this corona discharge wire can be produced automatically in a simple manner, and the cost of producing it is as low as possible.

This object is achieved by means of a corona discharge wire which is characterized in that on both sides of the discharge portion it is provided with a metallic fixing element which in the zone surrounding the wire forms a fused means which solidifies around the wire.

Production is particularly simple and the discharge wire operates with a particularly high degree of reliability when the fused mass surrounds the entire periphery of the wire.

According to the present invention it is preferred to use a fixing element which consists of a single piece of wire having two ends which extend parallel with the discharge wire and between which the discharge wire is accommodated, and which are interconnected by an annular extension. The production of a fixing element of this kind is extremely simple, and there is offered the possibility of using a standard cotter pin as the fixing element. The annular extension of the cotter pin also can be used for securing the corona discharge wire in the discharge apparatus and for effecting an electrical connection with the high-voltage source.

Good results also have been obtained with a fixing element which is made of an elongated strip of sheet metal which is bent over upon itself through 180° and which has an orifice for receiving the discharge wire at its turned-over edge. The superposed portions of the sheet metal embrace the discharge wire. According to the present invention the formation of a fused mass around the discharge wire can be achieved in a very simple manner by a spot-welding operation on the metallic fixing element in that zone in which the discharge wire is to be secured to the fixing element.

This spot-welding also can be carried out directly at the corona discharge apparatus itself by introducing the pretensioned discharge wire into the fixing elements, firmly secured to the insulating corona frame, and then carrying out the welding operation. It also is possible in this very simple manner to provide a multi-wire corona discharge apparatus.

The invention will now be described in greater detail by reference to the drawings in which:

FIG. 2 illustrates a fixing element and the forward end of the actual discharge wire;

FIGS. 3, 3a and 3b illustrate in two views a further form of such fixing element;

FIG. 4 illustrates a fixing element for two discharge wires and corresponding substantially to the element illustrated in FIG. 3;

FIGS. 5, 5a and 5b illustrate in two views on a larger scale the electrodes for carrying out the spot-welding operation; and FIG. 5c shows a further form of electrode.

Figure 1:
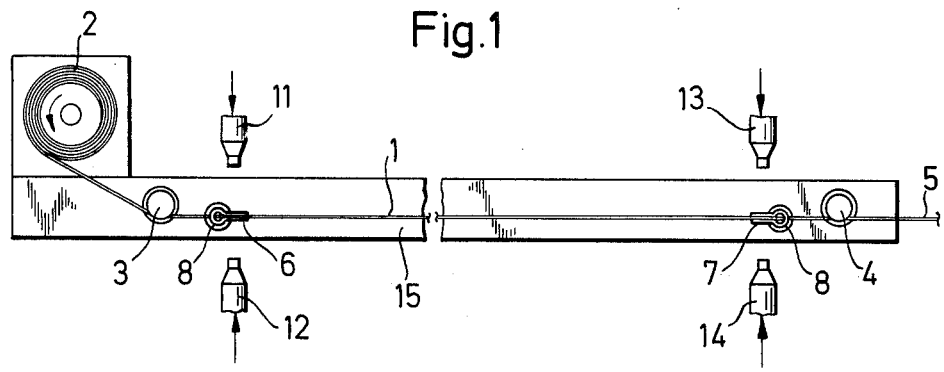
FIG. 1 is a diagrammatic illustration of the corona discharge wire of the invention seen in a machine for producing the wire.

In machine 15 illustrated in FIG. 1, discharge wire 1 is wound on roll 2 and is pre-stressed across the clamping and tensioning points 3 and 4 in the direction of 5. The wire passes through two cotter pins 6 and 7 of the kind commercially available. Referring to FIG. 2 the ends 9 and 10 projecting from the ring 8 of each of these cotter pins embrace the discharge wire 1.

Figure 1A:
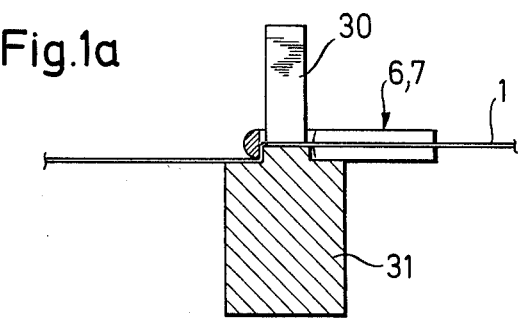
FIGS. 1a and 1b show on an enlarged scale a detail of the machine illustrated in FIG. 1.
Figure 1B:
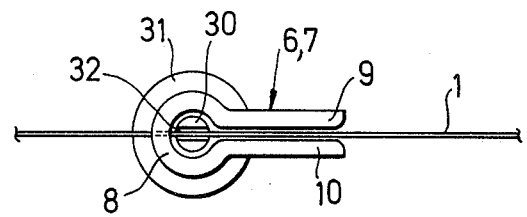

FIGS. 1a and 1b illustrate on a larger scale how each cotter pin is fitted in the machine. The ring 8 of each cotter pin is fitted over a split pin 30 on a base 31. The slot 32 in the pin 30 terminates at a distance above the base 31 that is equal to half the thickness of the cotter pins 6, 7. This ensures that the discharge wire, tensioned between the clamping and tensioning points 3 and 4 disposed at a level corresponding to the top of the base, passes through the middle of the cotter pins 6 and 7.

The ends 9 and 10 of each of the cotter pins 6 and 7 are now spot-welded with the aid of pairs of electrodes 11, 12 and 13, 14 respectively, and at the same time the thin tungsten wire 1 is fused. The diagrammatically illustrated spot-weld 20 is formed.

After the wire has been severed beyond the ring 8 of each of the cotter pins 6 and 7, the corona discharge wire is ready for fitting in a discharge corona.

Tests have shown that heavy tensile loading of the corona wire 1 always causes the corona wire to break first between the cotter pins 6 and 7, but never detaches the cotter pins from the corona wire. It is assumed that the spot-welding causes the discharge wire 1 to fuse with the metal (e.g. steel) of the cotter pins, the high tensile strength being probably attributable to irregularities over the surface of the wire which at the same time constitute a lock that prevents the wire from being pulled out of the surrounding fused mass.

It is however also possible in the first place to fit the fixing elements 6 and 7 firmly in an insulating frame of a corona discharge apparatus and to weld in the pre-stressed discharge wire 1 in situ.

Two further forms of fixing elements in accordance with the present invention and for securing the discharge wire 1 are illustrated in FIGS. 3, 3a, 3b and 4. These fixing elements each consist of an elongated strip 16 of sheet metal bent over onto itself through 180° and having, within the bent-over portion 17, an orifice 18 through which the discharge wire 1 can be passed. The strip 16 of sheet metal is also provided with a fixing hole 19. In the case of this fixing element too the discharge wire 1 is secured by means of a surrounding fused mass as illustrated diagrammatically by the spot-weld 20.

The fixing element illustrated in FIG. 4 is substantially the same as that seen in FIG. 3 with the single difference that the element of FIG. 4 is intended to accommodate two discharge wires and has two holes 19, two orifices 18 and two spot-welds 20.

For the purpose of carrying out the spot-welding, electrodes of different configurations as shown in FIGS. 5, 5a, 5b and 5c can be used. In the case of fixing elements resembling cotter pins as illustrated for example in FIG. 2, electrodes 21, i.e., FIGS. 5a and 5b, have proved successful, the cylindrical forward ends 22 of the electrodes each having a transverse semi-circular groove 23 into which the ends 9 and 10 of the cotter pins 6 and 7 respectively precisely fit.

When fixing elements as illustrated in FIGS. 3 and 4 are used, good results are obtained with the electrode 24, the cylindrical head 25 of which has a part-spherical end 26 as shown in FIG. 5c.

Corona discharge wires, the discharge portions of which are made of tungsten and have a diameter of 54 $\mu$m have given particularly good results. Especially suitable metals for the fixing elements 6, 7 and 16 are ordinary steel, chromium-nickel steel, brass and bronze.

According to the present invention it is preferred to provide the fused mass surrounding the corona discharge wire by clamping the wire between two parts or sections of an associated fixing element made of the same material, and then carrying out a spot-welding operation. This results in a particularly good mechanical connection between the corona discharge wire and the fixing elements.

When performing the method of the present invention it is possible to produce corona discharge wires of any desired specific length by simply moving in one direction, the fixing element used for providing the surrounding fused mass. Special means for adjusting the length of the wire are not necessary since the required production length of the wire is automatically obtained on the basis of the distance between the two fixing elements, which distance is in turn determined by the apparatus. The length of wire as fitted differs from the production length by the elongation caused by tensile stress. This method can be readily carried out without additional labor and can be rendered automatic in a simple manner. Apart from the increased operational reliability of these corona-discharge wires, the corona-discharge equipment is considerably reduced in cost. It is furthermore possible to construct the corona-discharge apparatus to considerably closer dimensional tolerances to facilitate its incorporation in the copying machine.

What is claimed is:

1. A method of producing a corona discharge wire comprising disposing an electrically conductive wire of high tensile strength between two spaced mounting elements, each mounting element being bent to have two portions in spaced parallel relation surround said corona discharge wire which is passing through the middle of a securing hole provided in each mounting element, pre-stressing said discharge wire across clamping and tensioning points outside and beyond the mounting elements, said clamping and tensioning points being aligned with the mounting elements, and spot-welding said mounting elements to said discharge wire to form a solidified fused mass to include and to fix said discharge wire to the mounting elements.

2. The method as claimed in claim 1, wherein said pre-stressing is applied to said corona discharge wire in the direction in which said two portions of said mounting elements extend during the fusing of said discharge wire with each mounting element.

* * * * *